Sept. 29, 1964    W. H. SUTTON    3,150,798
AUTOMATIC PERIODIC ANIMAL FEEDER
Filed Aug. 23, 1961    2 Sheets-Sheet 1

WILLIAM H. SUTTON
INVENTOR.

BY
Wayland D. Keith
HIS AGENT

Sept. 29, 1964      W. H. SUTTON      3,150,798
AUTOMATIC PERIODIC ANIMAL FEEDER
Filed Aug. 23, 1961      2 Sheets-Sheet 2
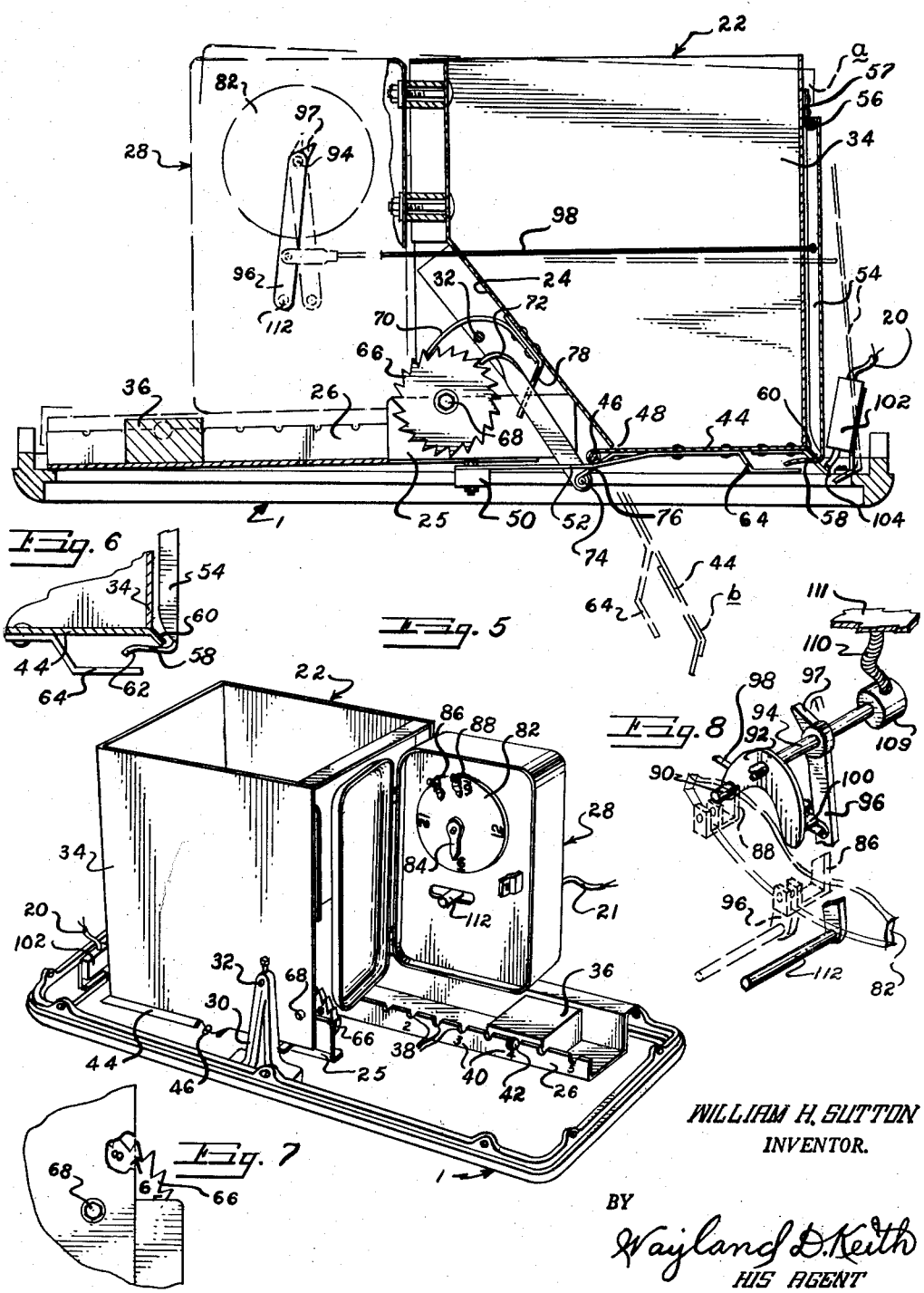
WILLIAM H. SUTTON
INVENTOR.
BY
Wayland D. Keith
HIS AGENT 3,150,798
AUTOMATIC PERIODIC ANIMAL FEEDER
William H. Sutton, Clifton, Tex.
(P.O. Box 13304, Fort Worth, Tex.)
Filed Aug. 23, 1961, Ser. No. 141,231
7 Claims. (Cl. 222—32)

This invention relates to animal feeders and more particularly to automatic, periodic feeders for dispensing animal feed, such as grain or mixed feed, granular or pulverized feed to the stall to feed animals, such as horses, cattle, dogs, poultry, and the like, when the animals are restrained within a compartment, or while running loose, such as in a pasture, but with access to the feeder.

Various feeders have been proposed heretofore, but these, for the most part, had certain limitations which made them unacceptable for popular use, some of the reasons for the unacceptability of such feeders being that they were undependable for feeding at predetermined, periodic intervals over a long period of time unattended, another reason was that some feeders would feed only a specific type of feed, and could not be adapted to change from dispensing one type feed to dispensing another type feed.

The present feeder is so designed that it is actuated automatically, at predetermined intervals, by a prime mover, which intervals can be set for periods of less than one hour apart to as much as twenty-four hours apart, which will enable the animals to be fed at regular, predetermined intervals, which intervals can be of equal length, or they may be varied in length, that is, if so desired, a predetermined period, such as the night period, may be skipped and the feed for use by the animals may be dispensed as many times during the remaining portion of the day as desired.

Since most general farms and farms which specialize in stock raising have electricity, the present device has been shown as being operated by an electric motor and an electric time clock; however, it is to be understood that the actuating mechanism may be a battery, or a spring or weight actuated mechanism, such as used to operate conventional clocks. It will be seen that, in remote places, the feeder may utilize a mechanism other than an electrically powered mechanism; therefore the versatility of these feeders for feeding both domestic and wild animals, and even fish and game birds, is unlimited.

The present feeder is so designed as to use standard timing devices, such as standard time clocks of the twenty-four hour variety, it is also to be understood, however, that by a special arrangement, the clock can be made to complete a cycle in less time or in longer time, in accordance with the gearing therein. For purposes of illustration, the present timing mechanism is shown to be a twenty-four hour electric timer, and while only one period of feeding has been provided for on the clock shown, it may be readily set to feed from one to twenty-four times a day, or more without using a specially designed clock mechanism.

An object of this invention is to provide a feeder for feeding animals at predetermined intervals and with specified amounts of feed.

Another object of the invention is to provide an automatic, periodic feeder for feeding animals, wherein the amount of feed can be determined by weight, and this amount of feed can be dispensed at predetermined intervals throughout the twenty-four hour period, and which will repeat, at the same time intervals, each twenty-four hour period, for so long a time as desired.

Still another object of the invention is to provide a feed dispensing device wherein the mechanism for dispensing the feed may be readily changed to dispense feed in varying quantities.

Still another object of the invention is to provide an automatic feed dispensing mechanism which will dispense feed periodically, but which will preclude overfeeding due to malfunction of the mechanism.

With these objects in mind and others which will become manifest as the description proceeds, reference is to be had to the accompanying drawings in which like reference characters designate like parts in the several views thereof, in which:

FIG. 1 is an elevational view of the feeder showing portions thereof broken away and in section to bring out the details of construction;

FIG. 2 is an elevational view taken at right angles to the view shown in FIG. 1, and showing portions of the hopper and of the housing as broken away and in section, to bring out the details of construction, and also showing the housing which encloses the screw conveyor broken away and in section, to show the relation of the screw conveyor to the associated parts, and showing the wiring thereof schematically;

FIG. 4 is an elevational view of the feed weighing, timing, and dispensing mechanism, shown apart from the reserve feed supply hopper and conveyor mechanism, and showing the dispensing mechanism in closed position in full outline, and showing the dispensing mechanism in open position in dashed outline, and also showing the timing mechanism in dashed outline;

FIG. 5 is a perspective view showing the base of the feeder with the weighing, timing and dispensing mechanisms mounted thereon;

FIG. 6 is a fragmentary, sectional, elevational view of a portion of the dispensing mechanism in closed position, and showing a pivot door latch thereon in engaged position, and showing a safety guard for the pivoted door latch;

Figure 1:
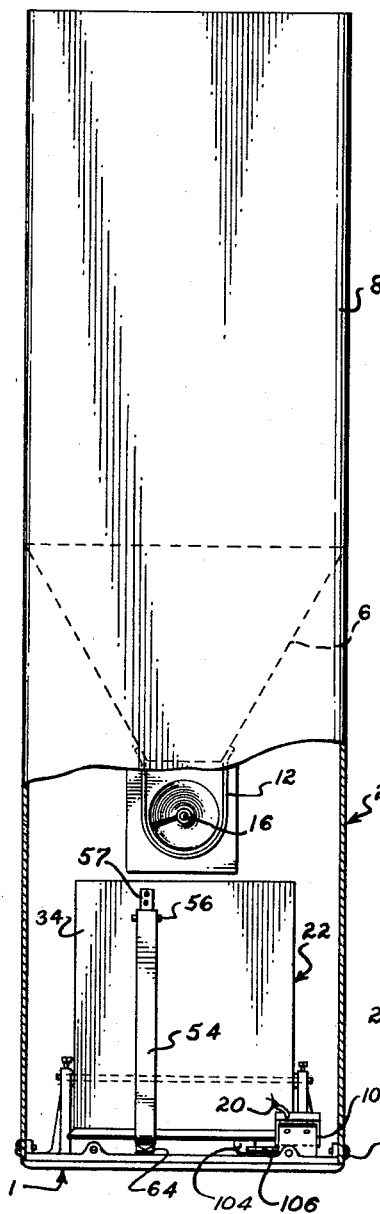
Figure 2:
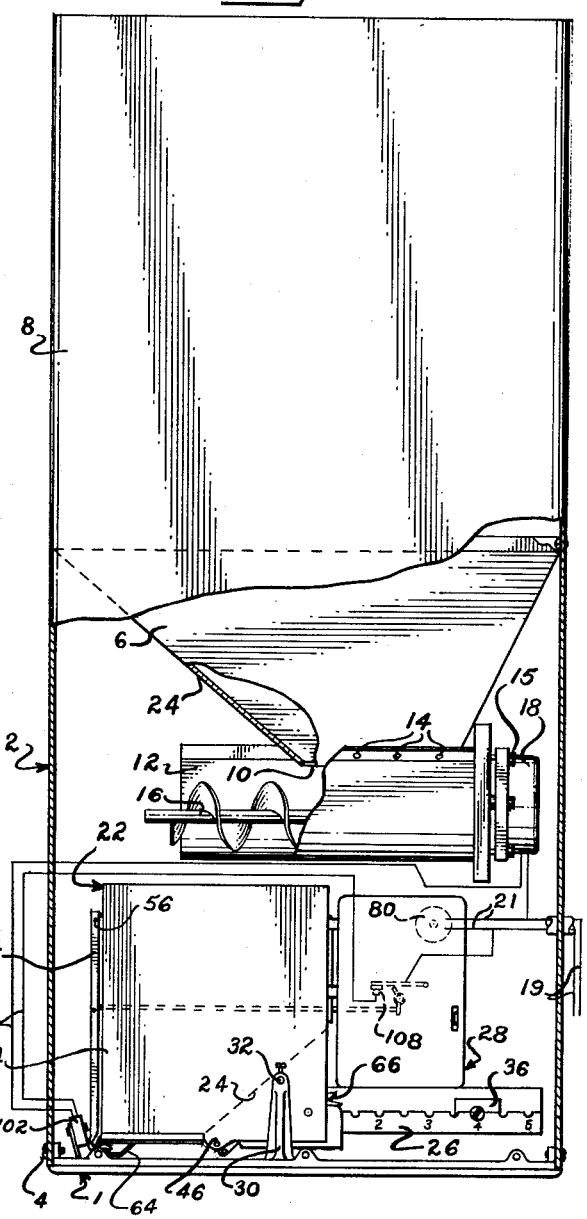
Figure 3:
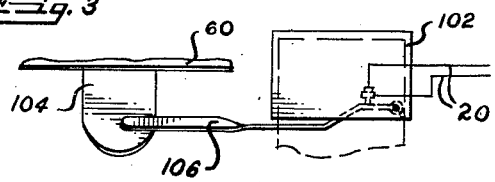
FIG. 3 is an enlarged, fragmentary, elevational view of a portion of the feed dispensing hopper and showing a switch mechanism connected therewith.

FIG. 7 is an enlarged fragmentary, elevational view, with parts broken away, of the mechanism for counting the feedings; and FIG. 8 is a fragmentary, perspective view of the actuating portion of the timing mechanism shown apart from the device, which mechanism actuates the dispensing mechanism, with one position thereof being shown in dashed outline and another position thereof being shown in full outline, with movable actuating cams being shown in dashed outline and positioned in spaced relation to the actuating mechanism so as to actuate the mechanism sequentially.

With more detailed reference to the drawing, the numeral 1 designates generally a base upon which housing 2 is secured, as by screw threaded elements 4. The housing 2 has a hopper 6 joined with the walls thereof to form a feed storage bin 8. The hopper 6 converges downwardly and inwardly and has an opening 10 in the lower side thereof. A screw conveyor housing 12 is connected to the lower side of hopper 6, as indicated at 14, so that the opening 10 in the hopper 6 will be below the top of screw conveyor housing 12. The screw conveyor 16 is mounted within housing 12 and is connected in driven relation with a prime mover 18, such as an electric motor, which electric motor is connected to an electrical circuit 19, which will be described more in detail hereinafter.

The hopper 6 supports the screw conveyor housing 12 and the screw conveyor 16 mounted therein, and the motor 18 which is mounted thereon by means of attachable fasteners 15. The conveyor housing is so mounted that the discharge end of the conveyor will be above the weighing and dispensing mechanism, which is designated generally at 22, so that the feed will be discharged into the hopper 34 thereof. The hopper 34 of the weighing and dispensing mechanism has three vertical walls, with the lower portion of the fourth wall sloping downwardly and inwardly, as shown at 24, so as to direct feed downward and to one side thereof. The dispensing hopper 34 also serves as the hopper for the weighing mechanism, which hopper has a timing mechanism, generally designated at 28, mounted thereon. The weighing mechanism, together with the timing mechanism are pivotally mounted on brackets 30 upstanding from the base 1. A pivot shaft 32 passes through the upstanding brackets 30 and the lower portion of the weighing and dispensing mechanism 22 pivotally mounts the weighing and dispensing and timing mechanisms thereon.

A channeled beam 26 is secured to the timing and weighing mechanism and extends outwardly in the opposite direction from the feed dispensing hopper 34 to form a scale beam, as shown in FIG. 5, on which a movable weight 36 is positioned within channeled beam 26. The channeled beam 26, which forms the scale beam, has notches 38 therealong, adjacent which notches may be imprinted indicia 40. An outwardly projecting screw, or the like, 42 is mounted on weight 36 and extends laterally outward therefrom, so it may be selectively engaged in one of the notches 38 to maintain the weight in fixed relation with respect to the scale beam 26. The indicia 40 may indicate ounces, pounds, or other unit of weight which is to be used in the weighing and dispensing mechanism 22. In this manner an accurate amount of feed may be dispensed periodically by the weighing mechanism in accordance with a planned schedule, whether at regular intervals or at irregular intervals.

In addition to the weighing and dispensing mechanism 22 being pivotally mounted on shaft 32, a door 44 is pivotally mounted on the lower side of the dispensing hopper 34 and is pivoted to swing about the axis of shaft 46 which is mounted on the lower side of the hopper 34. The door 44 closes the opening 48 in the lower side of dispensing hopper 34. A lever 52 is secured to door 44 along the bottom thereof and extends outwardly beyond the shaft 46 in the opposite direction from the center of gravity of the pivoted door 44, and has a weight 50 thereon. The weight 50 causes the door 44 to normally be moved to a closed position when the hopper 34 is free of feed. A door retainer latch 54 is pivoted by a pin 56 on support 57 which is mounted on the upper side of feed dispensing hopper 34 so that the latch 54 will swing about pin 56 as a pivot. The lower end of latch 54 has an inturned hook 58 thereon which is adapted to extend below pivoted door 44. The door 44 has a down-turned lip 60 to enable the hook 58 to engage a minimum surface of the door to facilitate the actuation of the latch 54 for opening the pivoted door 44. The hook 58 has a downwardly sloping portion 62 at the end thereof, which draws the pivoted door upward into binding relation with the lower edge of dispensing hopper 34. A guard member 64 is secured to pivoted door 44 and extends forwardly in overlapping relation with hook 58 of latch 54 so as to prevent an animal from manipulating the latch 54 in such manner as to open the pivoted door 44.

A sequence indicating mechanism, as will best be seen in FIGS. 4, 5, and 7, indicates the number of feedings of the weighing and dispensing mechanism, which sequence indicating mechanism has a ratchet wheel 66 rotatably mounted on bolt 68, which bolt 68 serves as an axle for ratchet wheel 66. The ratchet wheel 66 has indicia printed on a side thereof in such manner that only one of the indicia will be exposed to view at a time. A holding pawl 70 is mounted on the lower side of hopper 34 and extends downward into engagement with ratchet wheel 66. The holding pawl 70 is made of resilient material and holds the ratchet wheel 66 against retrogression. An actuating pawl member 72 is pivotally mounted at 74 to an outwardly extending arm 76 on the lower side of pivoted door 44, so, upon movement of the pivoted door 44 about pivot shaft 46 for dispensing feed, the actuating pawl 72 will be moved within slotted guide 78, which is mounted on the lower side of hopper 34. The pawl 72 will move the ratchet wheel 66 one tooth, which indicates that the feed being dispensed has moved the door 44 from the position shown in full outline in FIG. 4 to the position shown in dashed outline therein, thereby indicating the number of actual feedings which have been dispensed from hopper 34.

The electric circuit, indicated generally by the numeral 19, may be either A.C. or D.C. current and current may be supplied by a power line or by batteries, when an electric motor actuating mechanism is used. A time clock motor 80 is provided within the timing mechanism 28 to rotate a disc 82 thereon one revolution every twenty-four hours, as in the present specific instance, with the disc 82 being divided into time intervals, such as hours and minutes. The disc 82 rotates beneath non-movable pointer 84 which is mounted on timing mechanism 28, the relative position of the disc to the pointer designating the time that certain intervals take place. The disc 82 has cam member 86 and 88 attachably secured to the periphery thereof, so as to coincide with the scheduled time of performing the feeding operation and the latching of the pivoted door in the lower side of the feed dispensing hopper, as will be more fully brought out hereinafter. The action performed by the cams 86 and 88, which are attachably secured to the periphery of disc 82 is mechanical in that cam 88 engages a projection 90 on an arm 92 to pivot a shaft 94 mounted within timer mechanism 28, which, in turn, actuates a lever 96 from the position indicated in full outline to the position as indicated in dashed outline in FIG. 8, to move a rod 98 longitudinally, which rod is pivotally connected to latch 54 so as to move the latch from the full outline position shown in FIG. 4 to the dashed outline position shown therein. The cam 86 is adapted to engage a projection 100 mounted on arm 92, so as to pivot shaft 94 about its axis to move the arm 96 in the opposite direction, which moves latch 54 from the dashed outline position to the full outline position, as shown in FIG. 4, to latch the pivoted door 44 into closed position, as will be brought out more fully hereinafter.

A switch 102 is mounted on base 1 within housing 2 and is protected by the housing 2 from manipulation or tampering, by the stock being fed. The switch 102 is spring loaded, and when door latch 54 is in closed position, and the weighing hopper 34 is in the full outline position, as indicated in FIG. 4, the pivoted door 44 is held upward, so an outwardly extending lug 104 presses upward on lever 106, which lever is pivotally mounted on the base of switch 102. The lever 106, when pressed upward, will cause the contacts of the switch to close, which closes the circuit 20 leading therethrough, and with the switch 108 within the timer mechanism 28 closed, the motor 18 will be energized, which will turn screw conveyor 16 in a manner to auger the feed within housing 12 outward at the distal end of the conveyor 16, and into weighing and dispensing hopper 34, until the hopper 34, which is counterweighted by weight 36, tips about pivot shaft 32 from the full outline position shown in FIG. 4 to that shown in dashed outline, as indicated at a, therein. This pivoting action will cause lug 104 to move downward away from lever 106, which will permit switch 102 to open circuit 20. The opening of switch 102 will break the circuit 20 which energizes motor 18, whereupon, the motor 18 will cease to operate, as the amount of feed dispensed from reserve hopper 6 has been accurately weighed. The hopper 34 containing the weighted feed, will remain in the position as indicated in dashed outline at a until the disc 82 is rotated by time clock 80 until cam 88, which is adjustably secured to the periphery of disc 82, engages projection 90 on lever 92, which will cause shaft 92 to pivot about its axis as the projection 90 and lever 92 move upward to permit the cam 88 to pass thereby, whereupon, the shaft 94, during the pivoting action thereof, moves levers 96 and 97, which are attached to shaft 94, from the position indicated in full outline to that shown in dashed outline in FIG. 8.

The lever 96 has a longitudinally movable rod 98 pivotally connected thereto at one end thereof, the other end of which rod pivotally connects to feed dispensing door latch 54, whereupon, the latch 54 is moved to a position as indicated in dashed outline in FIG. 4, to permit pivoted door 44 to swing from the position as shown in full outline to the position as indicated at b, which is shown in dashed outline, which movement opens the bottom of dispensing hopper 34 to dispense the feed into a trough, feeding receptacle or the like. When the levers 96 and 97 are moved from the position as shown in full outline, to the position shown in dashed outline in FIG. 8, the contacts of the switch 108 are opened so as to provide a double safety feature, by having switches 102 and 108 open to prevent the motor 18 running, which would auger feed from the hopper 6 while the pivoted door 44 is open. However, upon completion of the dispensing cycle, through open pivoted door 44, the counterweight 50 will move the door 44 upward against the lower side of hopper 34 to close the opening 48 therein. The weight of the timing mechanism 28, the beam 26, and the weight 36 is such that, when the feed is dispensed from hopper 34, the weighing mechanism 28 and hopper assembly 22, which will pivot on shaft 32, are moved from the position as shown at a, in dashed outline in FIG. 4, to the full outline position indicated in FIG. 4. Whereupon, the hopper will remain in this position, but with the latch 54 in the position as shown in dashed outline, until the latch 54 is moved by longitudinally movable rod 98, as will be more fully brought out hereinafter. With the hopper being in the position as shown in full outline in FIG. 4, and upon the door 44 being closed, as indicated in full outline, the lug 104 will move lever 106 upward to close contact points of switch 102, which will close this portion of the circuit 20. The action of closing latch 54 and switches 102 and 108 can be set to take place less than one hour prior to the feeding time, thereby further obviating the danger of accidental discharge, until almost feeding time, when accidental discharge would be of minor importance, should it occur.

The lever 97 maintains switch 108 in open position, when the lever is in the position as indicated in dashed outline in FIG. 8, however, the clock motor 80 is in circuit 21, which is not affected by the opening and closing of switches 102 and 108. The clock motor will rotate disc 82 until cam 86 engages a projection 100, which will move the lever 92 on which the projection 100 is mounted about the axis of shaft 94, this movement will, in turn, move levers 96 and 97 from the position shown in dashed outline to the position shown in full outline in FIG. 8, the movement of lever 97 being such as to permit the contacts of switch 108 to close. The lever 96, which is integrally connected with lever 97, will move rod 98 longitudinally, as indicated in FIGS. 4 and 8, which will move the latch 54 from the dashed outline position, as shown in FIG. 4, to the full outline position shown therein, which will cause the inwardly extending hook member 58 to engage the downwardly extending lip or projection 60, on the lower edge of pivoted door 44, into binding engagement with the lower edges of side walls of the weighing and dispensing hopper 34, and upon so doing, the lever 97 will close the contacts of switch 108, which will complete the circuit 20 through switch 102 to energize the motor 18 to operate auger 16 to refill the hopper 34 with feed, in the manner set out hereinabove, which hopper will remain filled ready for dispensing, until the time clock 80 rotates disc 82 and cam 88 into the dispensing position, as described above. The filling operation may be set to take place an hour or so prior to the feeding operation, if desired, by so positioning cam 86.

The lever 96, which extends downward from the shaft 94, has an outwardly extending handle 112 mounted thereon. The handle 112 extends outward through the face of timing mechanism 28, so the handle 112 may be manually operated to energize the mechanism of the feeder, which handle 112 moves the lever 96, which in turn, moves rod 98 and lever 97 to operate the mechanism connected thereto and operable thereby in the same manner as if operated by the clock 80.

The shaft 94 has a collar 109 secured thereto, to which collar one end of a distorted compression spring 110 is attached. The other end of the distorted compression spring 110 abuts with a stationary member 111 and is fixed against lateral movement with respect thereto, which spring is so positioned as to impart a toggle action to shaft 94, when the shaft is moved a predetermined distance by cams 86 and 88. By having this toggle action operating the shaft 94 quickly from one position to another, after being moved a predetermined distance by the respective cams, the switch 108 is opened and closed quickly, with a minimum of arcing, and positive engagement and disengagement of latch 54 is assured, and the rod 98 is held in a fixed position.

Having thus clearly shown and described the invention, what is claimed as new and desired to be secured by Letters Patent is:

1. In a time controlled feeding mechanism, a base, a feed storage hopper mounted on said base, a feed dispensing hopper to receive feed from said feed storage hopper, a pivoted feed dispensing door mounted on said feed dispensing hopper, a latch on said feed dispensing hopper for selectively latching said feed dispensing door into closed position, a weighing mechanism operatively associated with said feed dispensing hopper pivotally mounted on said base to enable a weighed amount of feed to be dispensed from said feed dispensing hopper, means on said weighing mechanism to instantly vary the weighed amount of feed to be dispensed, a timing mechanism, a rotatable member mounted on said timing mechanism in timed relation with respect thereto, a plurality of attachable, adjustable cam means fitted on said rotatable member, at least one of said cam means being adapted to move to open said pivoted door at a time predetermined by the setting of said timing mechanism, and at least one other of said cam means being adjustable with respect to said first cam means to move said latch to engage said pivoted door at a predetermined time.

2. In a time controlled feeding mechanism, a base, a housing mounted on said base, a feed storage hopper within said housing a spaced distance above said base, downwardly extending members connected to the lower end of said feed storage hopper to form an open bottom chute, a conveyor housing secured to the lower end of said chute, a conveyor member operably mounted in said conveyor housing, power means connected to said conveyor member for selectively operating said conveyor member, a feed dispensing hopper pivotally mounted on said base, which hopper is located below the discharge end of said conveyor, a scale beam connected to said feed dispensing hopper and extending outwardly therefrom so as to counter-balance the weight of the feed dispensing hopper, weight means positioned on said scale beam and being movable therealong to weigh the contents of said feed dispensing hopper, means to selectively render said conveyor inoperative upon movement of said feed dispensing hopper when a predetermined weight of material is dispensed therein, said feed dispensing hopper having an open bottom formed therein, a pivoted door mounted on the bottom of said fed dispensing hopper and being adapted to close the open bottom thereof when in one position, latch means interengaging between said pivoted door and said feed dispensing hopper to selectively hold said pivoted door in closed position, time controlled means operably connected to said pivoted door to open said door to discharge a predetermined amount of feed, and means which is time controlled to selectively latch said door in closed position.

3. A time controlled feeding mechanism as defined in claim 2; wherein said latch means is mounted on said feed dispensing hopper, and wherein said means which is time controlled mechanically latches said pivoted door in closed position after a predetermined lapse of time after said feed has been dispensed from said feed dispensing hopper.

4. A time controlled feeding mechanism as defined in claim 2; wherein said means which is time controlled mechanically latches said pivoted door in closed position by said latch means a predetermined lapsed time after the feed has been dispensed from said feed dispensing hopper, and wherein said power means connected to said conveyor member is an electrically operated motor, said means to selectively render said conveyor inoperative upon movement of said feed dispensing hopper when a predetermined weight of material is dispensed thereinto includes an electrical circuit connected to said motor, at least one normally open switch within said electrical circuit leading to said motor, so when said pivoted feed dispensing hopper is filled to a predetermined weight with feed the hopper will move into position to open said switch to break said circuit leading to said motor.

5. A time controlled feeding mechanism as defined in claim 4; wherein a second switch is provided in series within said electrical circuit leading to said motor, and means operable by said means which is time controlled to open said second switch to prevent the dispensing of feed while said pivoted door is open, and means closing said second switch upon the latching of said pivoted door.

6. A time controlled feeding mechanism as defined in claim 2; wherein a counting mechanism is mounted on said feed dispensing hopper, means engageable with said counting mechanism to move said counting mechanism a predetermined distance upon each movement of said pivoted door in one direction.

7. In a time controlled feeding mechanism as defined in claim 2; wherein said latch means has a hook portion thereon which extends beneath said pivoted door, a latch guard means secured to the lower side of said pivoted door and having the distal end thereof in overlapping relation with said hook portion of said latch means.

References Cited in the file of this patent

UNITED STATES PATENTS

| | | |
|---|---|---|
| 280,084 | Rose | June 26, 1883 |
| 1,503,335 | Rose | July 29, 1924 |
| 3,001,672 | Wahl | Sept. 26, 1961 |